US012811034B2

(12) United States Patent
Hsiao et al.

(10) Patent No.: US 12,811,034 B2
(45) Date of Patent: Nov. 24, 2026

(54) CHIP RESISTOR

(71) Applicant: YAGEO CORPORATION, Kaohsiung City (TW)

(72) Inventors: Shen-Li Hsiao, Kaohsiung City (TW); Po-Hsun Shih, Kaohsiung City (TW); Kuang-Cheng Lin, Kaohsiung City (TW)

(73) Assignee: YAGEO CORPORATION, Kaohsiung City (TW)

( * ) Notice: Subject to any disclaimer, the term of this patent is extended or adjusted under 35 U.S.C. 154(b) by 516 days.

(21) Appl. No.: 18/530,747

(22) Filed: Dec. 6, 2023

(65) Prior Publication Data

US 2025/0140450 A1 May 1, 2025

(30) Foreign Application Priority Data

Nov. 1, 2023 (TW) ................................ 112142049

(51) Int. Cl.
*H01C 1/14* (2006.01)
*H01C 7/00* (2006.01)

(52) U.S. Cl.
CPC ................ *H01C 1/14* (2013.01); *H01C 7/00* (2013.01)

(58) Field of Classification Search
CPC . H01C 1/14; H01C 1/148; H01C 7/00; H01C 7/003; H01C 17/006
See application file for complete search history.

(56) References Cited

U.S. PATENT DOCUMENTS

| | | | | |
|---|---|---|---|---|
| 6,809,626 B2 * | 10/2004 | Chu | H01C 7/02 | 337/167 |
| 9,953,749 B2 * | 4/2018 | Park | H01C 1/06 | |
| 10,008,310 B1 | 6/2018 | Ryu et al. | | |
| 10,181,367 B2 | 1/2019 | Ryu et al. | | |
| 11,769,612 B2 * | 9/2023 | Moriya | H01C 1/028 | 338/226 |
| 2018/0137957 A1 | 5/2018 | Choi | | |

FOREIGN PATENT DOCUMENTS

| | | |
|---|---|---|
| CN | 106898449 A | 6/2017 |
| CN | 106935340 A | 7/2017 |
| CN | 108428525 A | 8/2018 |

(Continued)

*Primary Examiner* — Kyung S Lee
(74) *Attorney, Agent, or Firm* — CKC & Partners Co., LLC

(57) ABSTRACT

A chip resistor includes a substrate, first and second conductive structures in the substrate, first to third front electrodes and first to third back electrodes respectively on front and back surfaces of the substrate, first and second resistance layers respectively on the front and back surfaces, and first and second external electrode layers. The first to third front electrodes are opposite to the first to third back electrodes. The first back electrode and the first front electrode are connected to the first conductive structure. The first resistance layer is connected to the second front electrode and the second conductive structure. The second resistance layer is connected to the first and third back electrodes and the first and second conductive structures. The first and second external electrode layers respectively connect the first front electrode and the first back electrode, and the second front electrode and the second back electrode.

15 Claims, 8 Drawing Sheets

(56) References Cited

FOREIGN PATENT DOCUMENTS

| | | | |
|---|---|---|---|
| CN | 110364318 | A | 10/2019 |
| CN | 108428525 | | 3/2020 |
| CN | 114005630 | | 5/2022 |
| TW | 200625349 | A | 7/2006 |
| WO | 2019130744 | A1 | 7/2019 |

* cited by examiner

CHIP RESISTOR

RELATED APPLICATIONS

This application claims priority to Taiwan Application Serial Number 112142049, filed Nov. 1, 2023, which is herein incorporated by reference.

BACKGROUND

Field of Invention

The present disclosure relates to a passive device, and more particularly, to a chip resistor.

Description of Related Art

A conventional chip resistor mainly includes a pair of electrodes and a resistance layer spanning between the pair of electrodes. In the conventional chip resistor, laser cutting is used to change the current path of the resistance layer. According to Ohm's law of resistance, the longer the current path is, the greater the resistance is. Currently, when the same resistance material is used, there are generally two methods to increase the resistance of the chip resistor. The first method is to reduce the thickness of the resistance layer, and the second method is to increase the circuit graphics of the resistance layer. If the first method is used to increase the resistance of the chip resistor, the resistance layer may be too thin, which results in a decrease in the power tolerance of the product.

On the other hand, if the second method is used to increase the resistance of the chip resistor, it has to increase the number of laser cuts to increase the current path of the resistance layer. To increase the number of laser cuts, the resistance layer needs to be thickened first, and then the laser is used to cut the resistance layer to form a winding pattern. In addition, increasing the number of cuts will cause the spacing between the lines of the winding pattern of the resistance layer to be too close, for example, the line gap may be less than 7 μm. The thermal effect of laser processing will affect the resistance layer, which reduces the stability of electrical performance of the chip resistor.

In addition, resistors are marked with specifications for rated power and maximum operating voltage in the specification sheet. The specification means that when the resistance of the product is greater than a certain resistance value, the product specifications only apply to the maximum operating voltage and not to the rated power. In order to increase the withstand voltage of the product under the same rated power, it has to increase the current path of the resistance layer, that is, a resistance layer with a more meandering circuit pattern is needed, to reduce the potential on the circuit of the resistance layer, thereby reducing the voltage difference per unit length. However, according to Ohm's law, increasing the current path of the resistance layer will decrease the cross-sectional area of the current path of the resistance layer, thus resulting in a decrease in the power stability of the product.

SUMMARY

Therefore, one objective of the present disclosure is to provide a chip resistor, which includes a double-layer series resistance structure including a front resistance layer and a back resistance layer. Accordingly, the maximum resistance of the chip resistor can be increased by at least 1.5 times, or even close to 2 times while using the same resistance material.

Another objective of the present disclosure is to provide a chip resistor with a double-layer series resistor structure that can increase the path of the resistor and the cross-sectional area of the path. Therefore, under a fixed voltage, the voltage gradient per unit length of the resistor can be reduced. In addition, such a structure makes the chip resistor have a larger heat dissipation area, such that the chip resistor has higher operating power and higher maximum operating voltage.

According to the aforementioned objectives, the present disclosure provides a chip resistor, which includes a substrate, a first conductive structure, a second conductive structure, a first front electrode, a second front electrode, a third front electrode, a first back electrode, a second back electrode, a third back electrode, a first resistance layer, a first external electrode layer second resistance layer, a first protective layer, a second protective layer, and a second external electrode layer. The substrate has a front surface and a back surface, and a first through hole and a second through hole extending from the front surface to the back surface. The first conductive structure is disposed in the first through hole. The second conductive structure is disposed in the second through hole. The first front electrode, the second front electrode, and the third front electrode are spaced apart from each other on the front surface. The first front electrode and the second front electrode are respectively located on two opposite edge regions of the substrate, and the third front electrode is located between the first front electrode and the second front electrode. The first back electrode, the second back electrode, and the third back electrode are disposed on the back surface and respectively opposite to the first front electrode, the second front electrode, and the third front electrode. The first back electrode and the first front electrode are respectively connected to two opposite ends of the first conductive structure. The first resistance layer is disposed on the front surface and connected to the second front electrode and the second conductive structure. The second resistance layer is disposed on the back surface and connected to the first back electrode, the third back electrode, the first conductive structure, and the second conductive structure. The first protective layer covers the first resistance layer, the third front electrode, a portion of the first front electrode, and a portion of the second front electrode. The second protective layer covers the second resistance layer, the third back electrode, a portion of the first back electrode, and a portion of the second back electrode. The first external electrode layer extends from the first front electrode through a first side surface of the substrate to the first back electrode. The second external electrode layer extends from the second front electrode through a second side surface of the substrate to the second back electrode.

According to one embodiment of the present disclosure, the substrate is a ceramic substrate, and a material of the substrate is aluminum oxide, aluminum nitride, boron nitride, silicon carbide, or a glass-containing material.

According to one embodiment of the present disclosure, a diameter of each of the first through hole and the second through hole is from about 0.1 mm to about 1.0 mm, a distance between a center of the second through hole and an adjacent short side of the substrate is from ¼ to ⅓ of a length of the substrate, and a distance between the center of the second through hole an adjacent long side of the substrate is from ⅕ to ½ of a width of the substrate.

According to one embodiment of the present disclosure, the first through hole and the second through hole are filled with materials of the first front electrode and the third front electrode respectively, materials of the first back electrode and the third back electrode respectively, or materials of the first front electrode and the first back electrode and materials of the third front electrode and the third back electrode respectively.

According to one embodiment of the present disclosure, the first resistance layer and the second resistance layer are connected in series.

According to one embodiment of the present disclosure, materials of the first front electrode, the second front electrode, the third front electrode, the first back electrode, the second back electrode, and the third back electrode are copper, copper-nickel alloy, nickel-phosphorus alloy, or sintered silver paste containing silver and glass.

According to one embodiment of the present disclosure, materials of the first resistance layer and the second resistance layer are nickel-chromium alloy, copper-nickel alloy, nickel-chromium-silicon alloy, nickel-chromium-aluminum alloy, nickel-chromium-aluminum-silicon alloy, nickel-chromium-aluminum-yttrium alloy, nickel-chromium-tantalum-molybdenum alloy, tantalum nitride, copper-manganese-tin alloy, or copper-manganese-nickel alloy.

According to one embodiment of the present disclosure, materials of the first protective layer and the second protective layer are epoxy resin, polyimide (PI), resin, or glass-containing materials.

According to one embodiment of the present disclosure, each of the first external electrode layer and the second external electrode layer comprises a nickel-chromium layer, a nickel layer, and a tin layer stacked in sequence, or a nickel-chromium layer, a nickel layer, a copper layer, another nickel layer, and a tin layer stacked in sequence.

According to one embodiment of the present disclosure, the first external electrode layer and the second external electrode layer are higher than the first protective layer and the second protective layer by 5 μm or more than 5 μm.

BRIEF DESCRIPTION OF THE DRAWINGS

Aspects of the present disclosure are best understood from the following detailed description in conjunction with the accompanying figures. It is noted that in accordance with the standard practice in the industry, various features are not drawn to scale. In fact, dimensions of the various features can be arbitrarily increased or reduced for clarity of discussion.

FIG. 1A to FIG. 8 are schematic flow diagrams of a chip resistor in accordance with one embodiment of the present disclosure, wherein FIG. 1A to FIG. 7A are top views, FIG. 1B to FIG. 5B and FIG. 7B are bottom views, and FIG. 8 is a three-dimensional diagram.

DETAILED DESCRIPTION

Figure 1A:
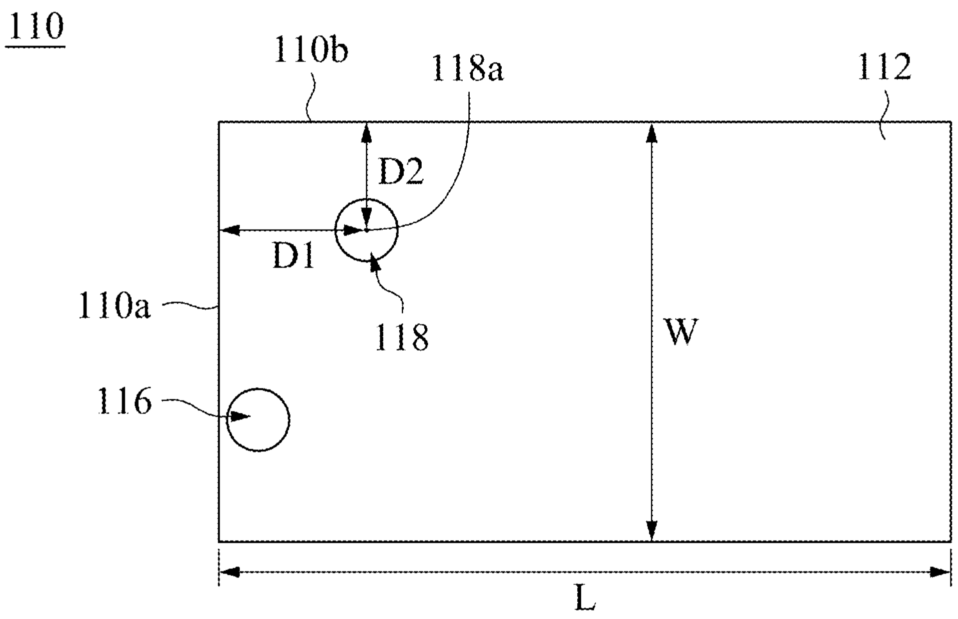
Figure 1B:
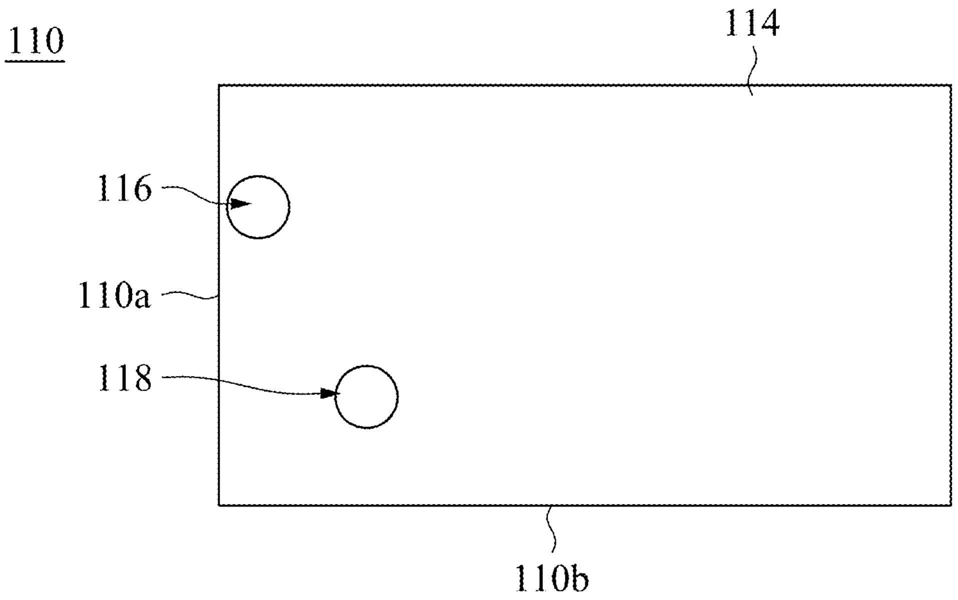

The embodiments of the present disclosure are discussed in detail below. However, it will be appreciated that the embodiments provide many applicable concepts that can be implemented in various specific contents. The embodiments discussed and disclosed are for illustrative purposes only and are not intended to limit the scope of the present disclosure. All of the embodiments of the present disclosure disclose various different features, and these features may be implemented separately or in combination as desired.

In addition, the terms "first", "second", and the like, as used herein, are not intended to mean a sequence or order, and are merely used to distinguish elements or operations described in the same technical terms.

The spatial relationship between two elements described in the present disclosure applies not only to the orientation depicted in the drawings, but also to the orientations not represented by the drawings, such as the orientation of the inversion. Moreover, the terms "connected", "electrically connected", or the like between two components referred to in the present disclosure are not limited to the direct connection or electrical connection of the two components, and may also include indirect connection or electrical connection as required.

Referring to FIG. 1A to FIG. 8, FIG. 1A to FIG. 8 are schematic flow diagrams of a chip resistor 100 in accordance with one embodiment of the present disclosure. The chip resistor 100 may mainly include a substrate 110 shown in FIG. 1A and FIG. 1B, a first conductive structure 120, a second conductive structure 122, a first front electrode 130, a second front electrode 132, a third front electrode 134, a first back electrode 140, a second back electrode 142, and a third back electrode 144 shown in FIG. 2A and FIG. 2B, a first resistance layer 150 shown in FIG. 5A, a second resistance layer 160 shown in FIG. 5B, a first protective layer 170 and a second protective layer 180 shown in FIG. 7A and FIG. 7B, and a first external electrode layer 190 and a second external electrode layer 200 shown in FIG. 8.

In manufacturing the chip resistor 100, the substrate 110 may be first provided. The substrate 110 may be a ceramic substrate. For example, a material of the substrate 110 may be aluminum oxide, aluminum nitride, boron nitride, silicon carbide, or a glass-containing material. The substrate 110 may be a flat plate structure. For example, as shown in FIG. 1A, the substrate 110 may be a rectangular flat plate structure with a length L and a width W. The substrate 110 has a front surface 112 and a back surface 114 that are opposite to each other, in which the front surface 112 and the back surface 114 may both be flat.

In the example shown in FIG. 1A, the substrate 110 has two through holes, namely a first through hole 116 and a second through hole 118. In other examples, the substrate 110 may have more than two through holes according to structural design requirements. The first through hole 116 and the second through hole 118 both extend from the front surface 112 to the back surface 114 of the substrate 110. The first through hole 116 and the second through hole 118 are adjacent to a short side 110*a* of the substrate 110. In some examples, the first through hole 116 and the second through hole 118 may be formed in the substrate 110 by using a laser processing method. Therefore, the first through hole 116 and the second through hole 118 may be circular through holes. For example, a diameter of the first through hole 116 and a diameter of the second through hole 118 may be ranging from about 0.1 mm to about 1.0 mm. By arranging the position of the second through hole 118 in the substrate 110, better utilization of the effective area of the substrate 110 can be achieved. In some exemplary examples, a distance D1 between a center 118*a* of the second through hole 118 and the adjacent short side 110*a* of the substrate 110 is ¼ to ⅓ of the length L of the substrate 110, and a distance D2 between the center 118*a* of the second through hole 118 and an adjacent long side 110*b* of the substrate 110 is ⅕ to ½ of the width W of the substrate 110.

Figure 2A:
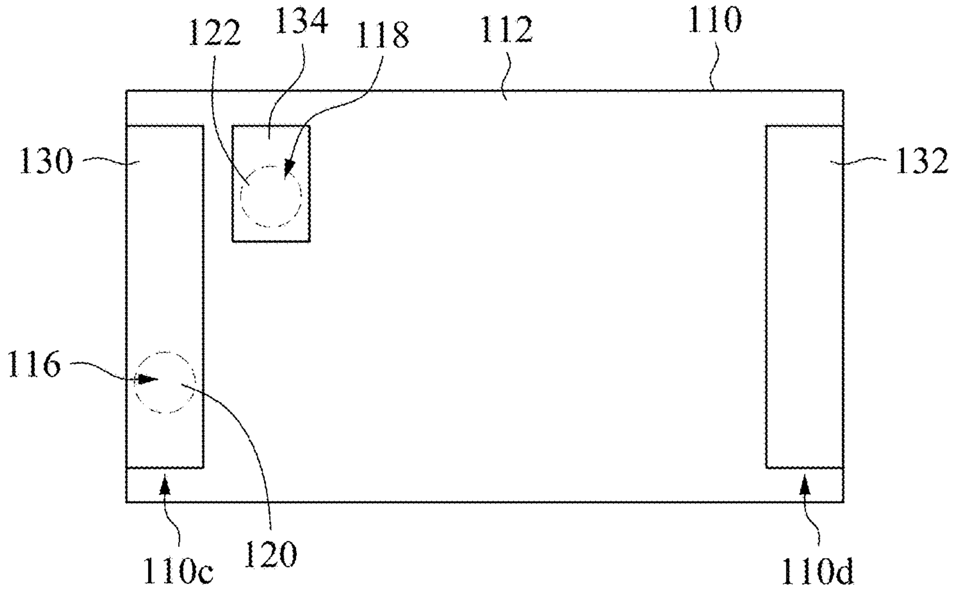

Next, as shown in FIG. 2A, the first front electrode 130, the second front electrode 132, and the third front electrode 134 may be formed on the front surface 112 of the substrate 110 by printing, or by sputtering and electroplating. The first front electrode 130, the second front electrode 132, and the third front electrode 134 are separated from each other. In the example shown in FIG. 2A, the first front electrode 130 and the second front electrode 132 are respectively located on two opposite edge regions 110*c* and 110*d* of the substrate 110, and the third front electrode 134 is between the first front electrode 130 and the second front electrode 132. The third front electrode 134 may be adjacent to the first front electrode 130, for example. Materials of the first front electrode 130, the second front electrode 132, and the third front electrode 134 may be low resistance materials, such as copper, copper-nickel alloy, nickel-phosphorus alloy, or sintered silver paste containing silver and glass.

Figure 2B:
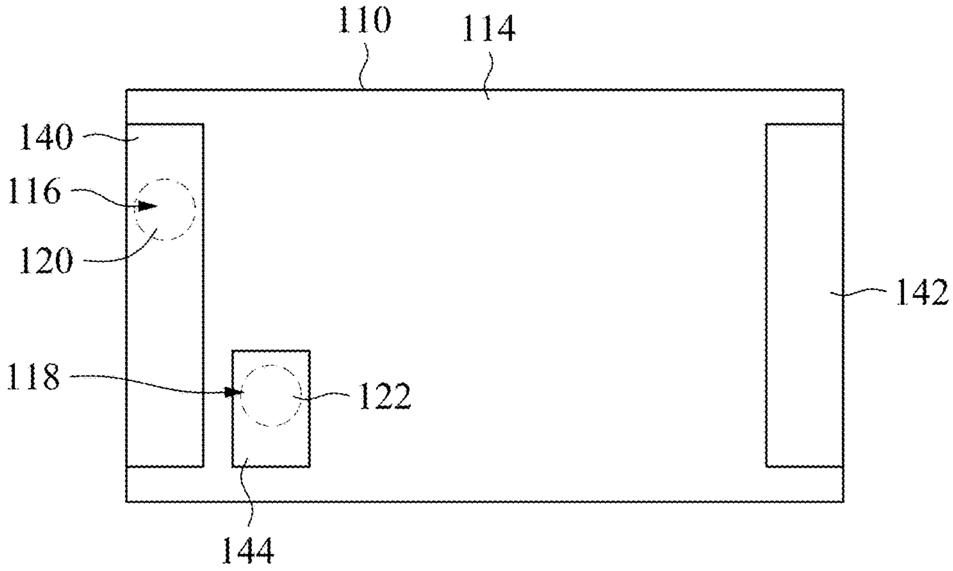

Then, as shown in FIG. 2B, the first back electrode 140, the second back electrode 142, and the third back electrode 144 may be similarly formed on the back surface 114 of the substrate 110 by printing, or by sputtering and electroplating. The first back electrode 140, the second back electrode 142, and the third back electrode 144 are respectively opposite to the first front electrode 130, the second front electrode 132, and the third front electrode 134. Therefore, the first back electrode 140, the second back electrode 142, and the third back electrode 144 are also separated from each other, and the third back electrode 144 is located between the first back electrode 140 and the second back electrode 142. Materials of the first back electrode 140, the second back electrode 142, and the third back electrode 144 may be low resistance materials, such as copper, copper-nickel alloy, nickel-phosphorus alloy, or sintered silver paste containing silver and glass. The order of forming the front electrode and the back electrode can be adjusted, and the back electrode can be formed first.

The first through hole 116 and the second through hole 118 of the substrate 110 may be filled with the materials of the first front electrode 130 and the third front electrode 134 respectively, the materials of the first back electrode 140 and the third back electrode 144 respectively, or the materials of the first front electrode 130 and the first back electrode 140 and the materials of the third front electrode 134 and the third back electrode 144 respectively. The electrode material filled in the first through hole 116 forms the first conductive structure 120. The electrode material filled in the second through hole 118 forms the second conductive structure 122. The first front electrode 130 and the first back electrode 140 are respectively connected to two opposite ends of the first conductive structure 120.

Figure 3A:
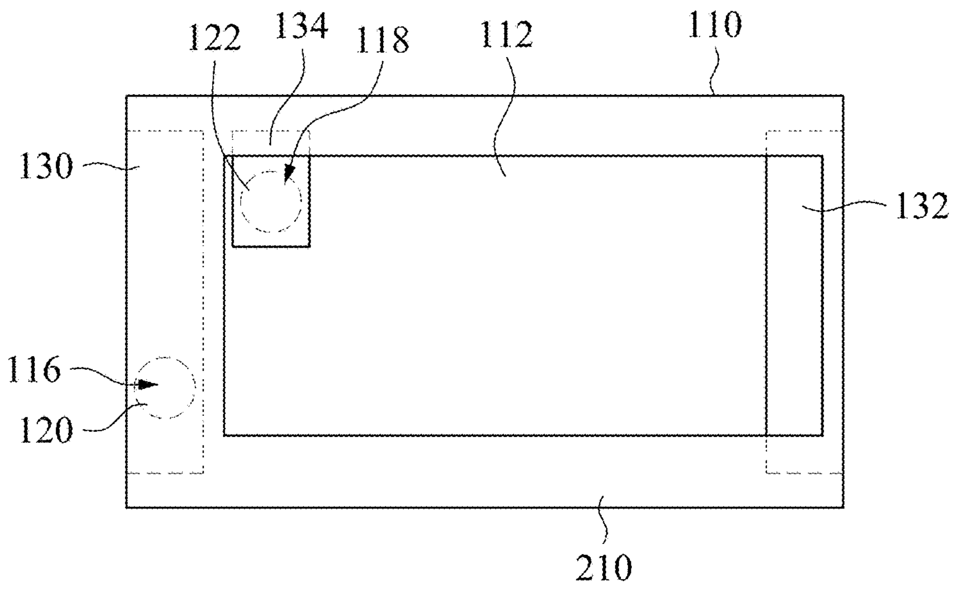
Figure 3B:
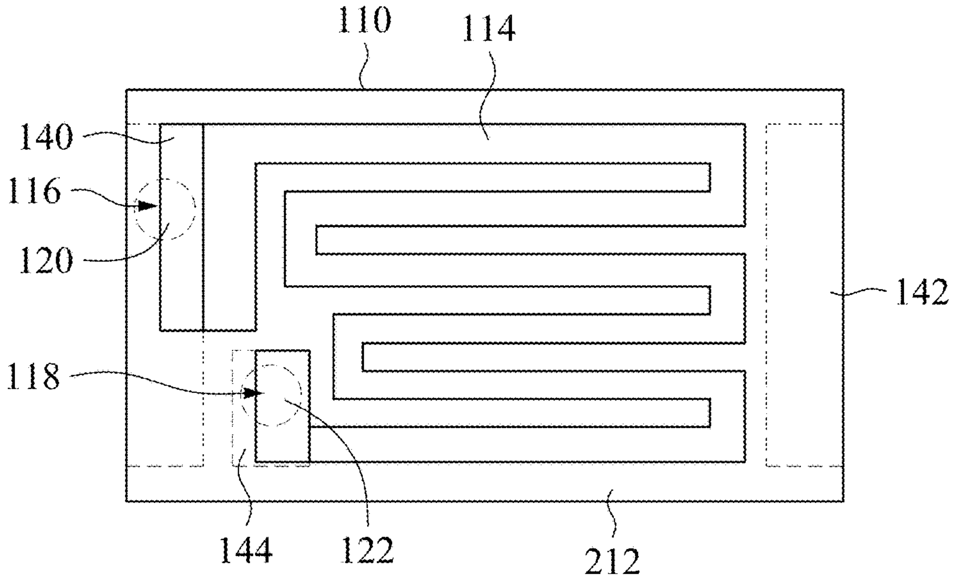

Then, the resistance layers of the chip resistor 100 may be fabricated. In some examples, shielding layers 210 and 212 may be respectively formed on the front surface 112 and the back surface 114 of the substrate 110. The shielding layers 210 and 212 can respectively shield the areas of the front surface 112 and the back surface 114 where the resistance layers are not to be formed, and thus have respective predetermined patterns. As shown in FIG. 3A, the shielding layer 210 covers the first front electrode 130, a portion of the second front electrode 132, a portion of the third front electrode 134, but a portion of the substrate 110, and the third front electrode 134 on the second conductive structure 122, and the area between the first front electrode 130 and the second front electrode 132 are exposed. As shown in FIG. 3B, the shielding layer 212 covers a portion of the first back electrode 140, the second back electrode 142, a portion of the third back electrode 144, and a portion of the substrate 110, but the third back electrode 144 on the second conductive structure 122, and a portion of the area between the first back electrode 140 and the second back electrode 142 are exposed. For example, a material of the shielding layers 210 and 212 is removable ink or photoresist. The shielding layers 210 and 212 may be formed by printing, sticking, or coating, for example.

Figure 4A:
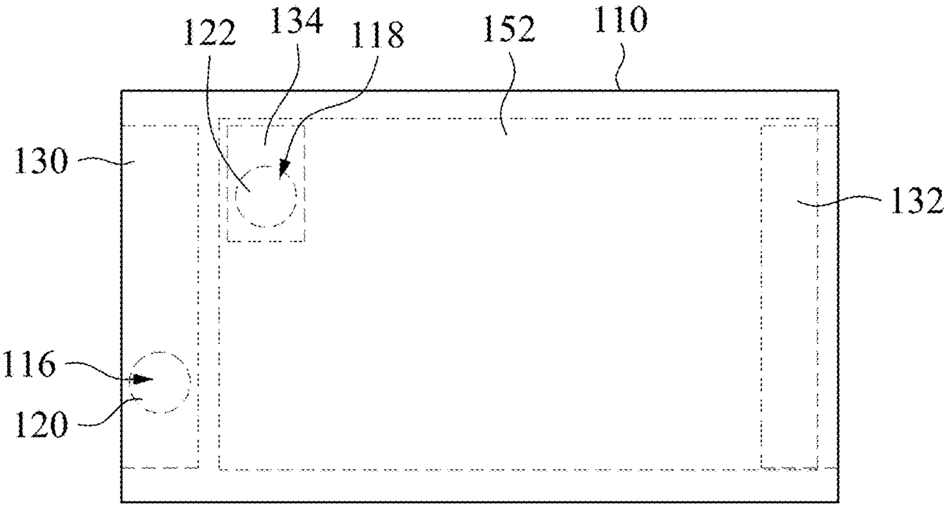
Figure 4B:
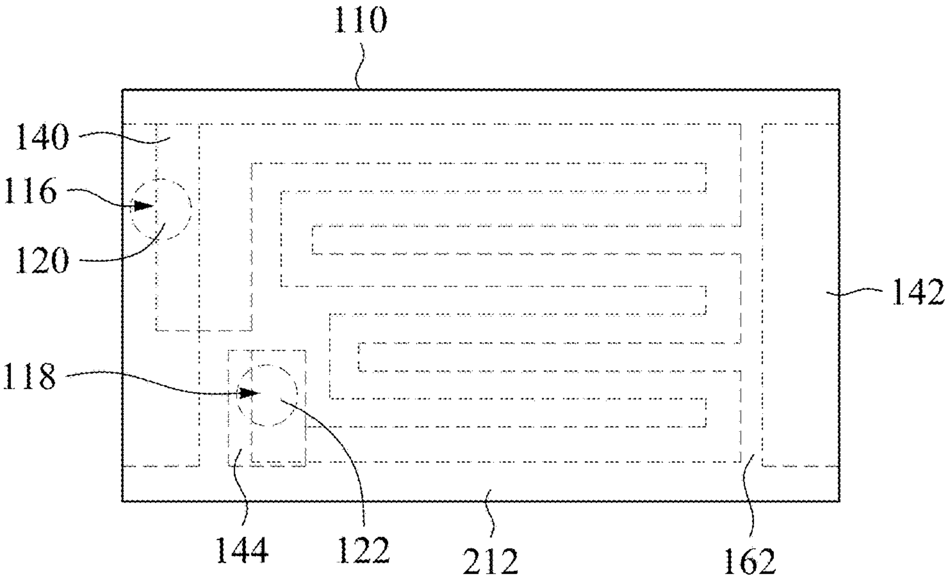
Figure 5A:
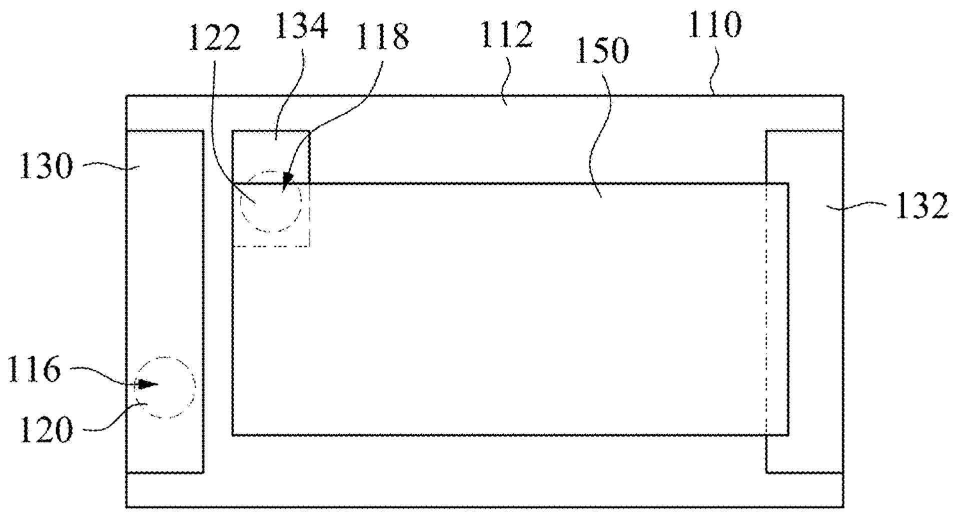
Figure 5B:
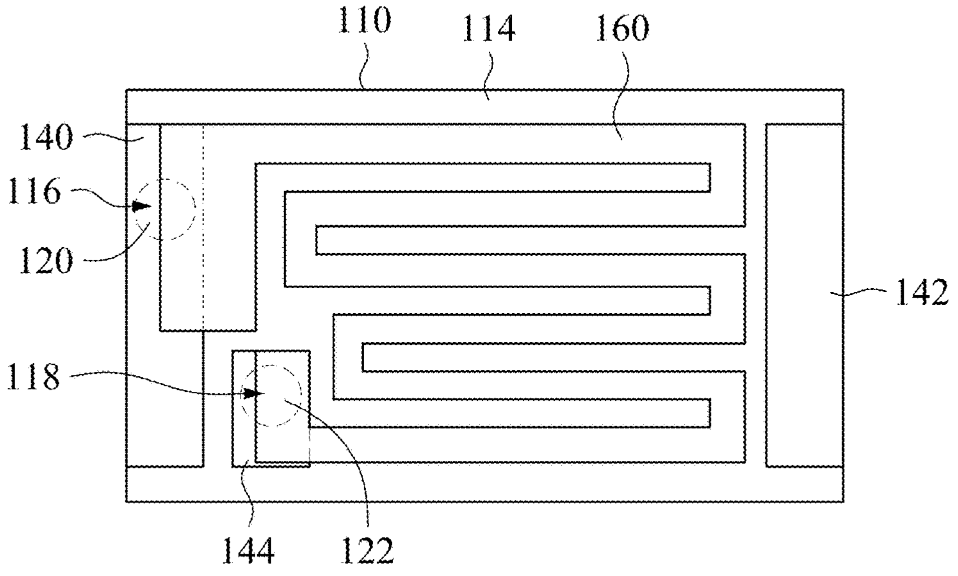

Next, as shown in FIG. 4A and FIG. 4B, resistance material layers 152 and 162 may be formed to cover the front surface 112 and the back surface 114 of the substrate 110 by, for example, sputtering. Subsequently, the shielding layers 210 and 212 are removed by solvent or water washing. When the shielding layers 210 and 212 are removed, the resistance material layers 152 and 162 on the shielding layers 210 and 212 are also removed, and the first resistance layer 150 and the second resistance layer 160 having predetermined patterns are respectively formed on the front surface 112 and back surface 114 of the substrate 110, as shown in FIG. 5A and FIG. 5B. For example, materials of the first resistance layer 150 and the second resistance layer 160 may be metal alloy, such as nickel-chromium alloy, copper-nickel alloy, nickel-chromium-silicon alloy, nickel-chromium-aluminum alloy, nickel-chromium-aluminum-silicon alloy, nickel-chromium-aluminum-yttrium alloy, nickel-chromium-tantalum-molybdenum alloy, tantalum nitride, copper-manganese-tin alloy, or copper-manganese-nickel alloy. The present disclosure can use other suitable resistance materials and is not limited thereto.

Figure 9:
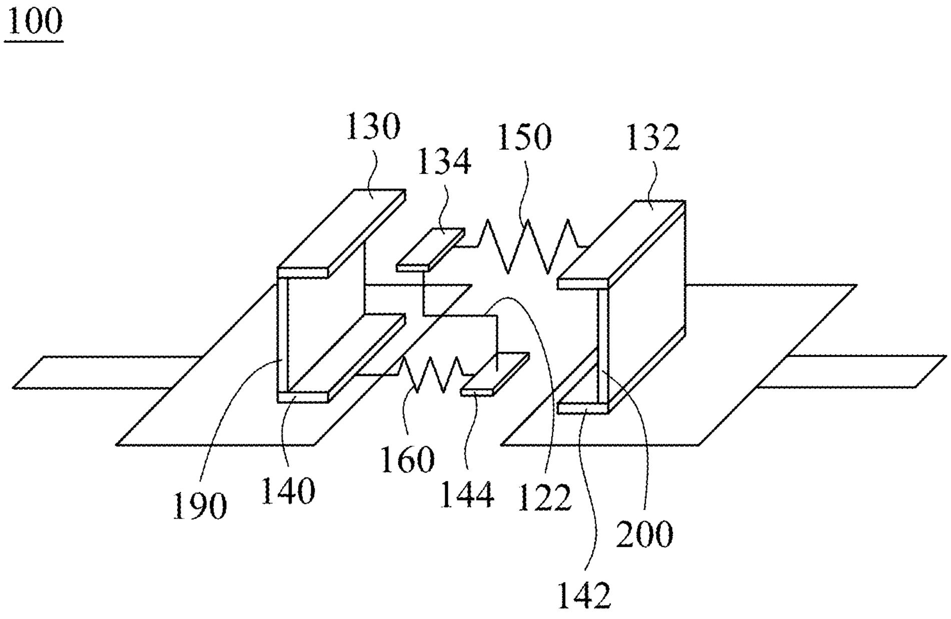
FIG. 9 is a schematic diagram of an equivalent circuit model of a chip resistor in accordance with one embodiment of the present disclosure.

As shown in FIG. 5A and FIG. 5B, the first resistance layer 150 is directly connected to the second front electrode 132, and the first resistance layer 150 is indirectly connected and electrically connected to the second conductive structure 122 through the second front electrode 132. The second resistance layer 160 is directly connected to the first back electrode 140 and the third back electrode 144, and the second resistance layer 160 is indirectly connected and electrically connected to the first conductive structure 120 and the second conductive structure 122 through the first back electrode 140 and the third back electrode 144 respectively. Referring to FIG. 9 first, FIG. 9 is a schematic diagram of an equivalent circuit model of a chip resistor 100 in accordance with one embodiment of the present disclosure. Through the second conductive structure 122, the first resistance layer 150 on the front surface 112 of the substrate 110 and the second resistance layer 160 on the back surface 114 can be connected in series.

Such a double-layer series resistor structure can significantly increase the maximum resistance of the chip resistor 100, for example, by at least 1.5 times while using the same resistance material. In addition, due to the design of the double-layer series resistor, the path of the resistor and the cross-sectional area of the path can be increased. Thus, under a fixed voltage, the voltage gradient per unit length of the resistor can be reduced. Furthermore, the structure of the double-layer series resistor can greatly increase the heat dissipation area of the chip resistor 100, thereby increasing the operating power and the maximum operating voltage of the chip resistor 100.

Figure 6A:
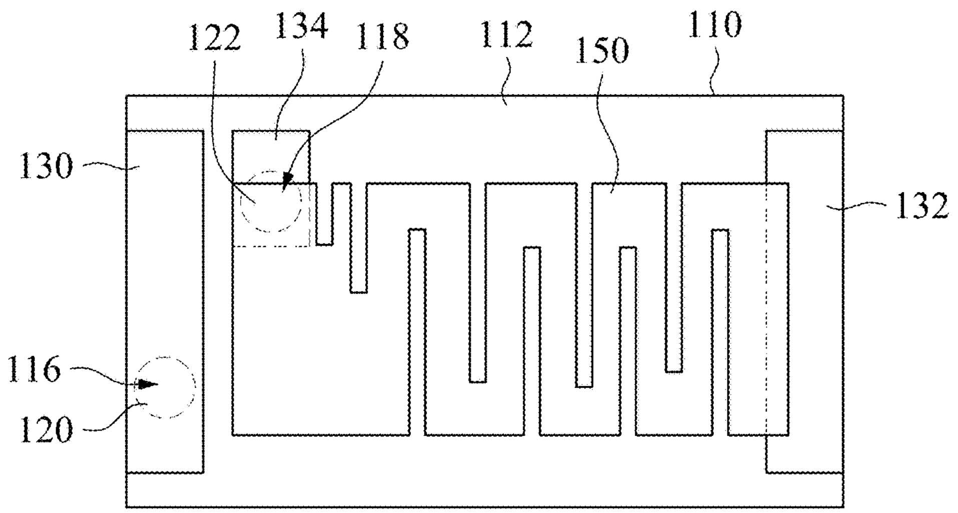

Next, the resistance adjustment operation may be selectively performed according to the product requirements of the chip resistor 100. In some examples, as shown in FIG. 6A, the first resistance layer 150 is patterned by using laser or physical processing to adjust the resistance of the chip resistor 100. The resistance adjustment operation can also be performed by patterning the second resistance layer 160.

Figure 7A:
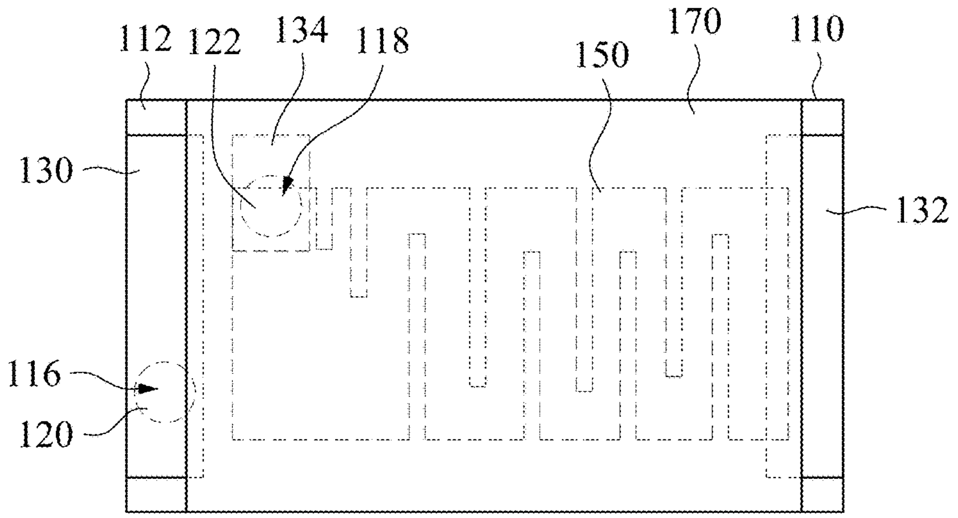
Figure 7B:
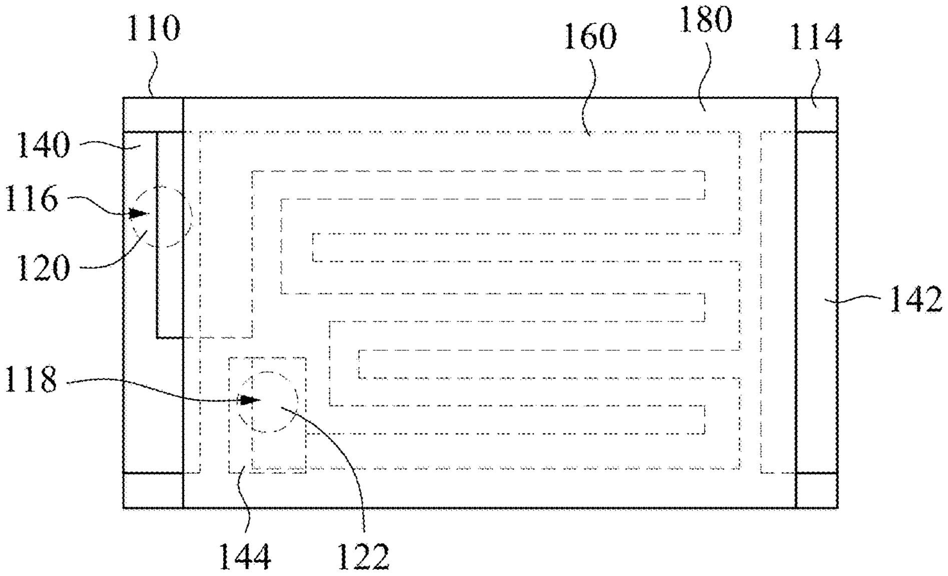
Figure 8:
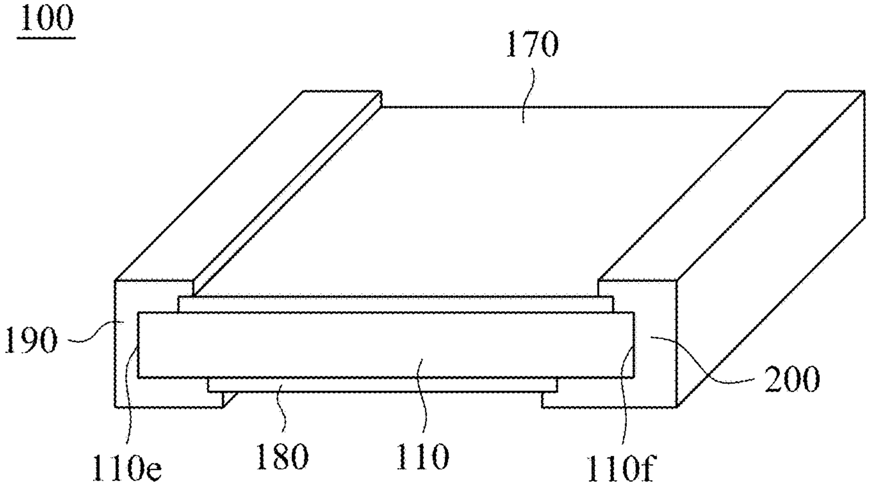

As shown in FIG. 7A and FIG. 7B, after the resistance adjustment operation of the chip resistor 100 is completed, the first protective layer 170 and the second protective layer 180 are respectively formed on the front surface 112 and the back surface 114 of the substrate 110 by printing, or deposition and photolithography. The first protective layer 170 covers the entire first resistance layer 150, the entire third front electrode 134, a portion of the first front electrode 130, and a portion of the second front electrode 132. The second protective layer 180 covers the entire second resistance layer 160, the entire third back electrode 144, a portion of the first back electrode 140, and a portion of the second back electrode 142. In some examples, materials of the first protective layer 170 and the second protective layer 180 are epoxy resin, polyimide, resin, or glass-containing materials.

Subsequently, the first external electrode layer 190 and the second external electrode layer 200 of the chip resistor 100 may be fabricated. The first external electrode layer 190 extends from the first front electrode 130 through a first side surface 110*e* of the substrate 110 to the first back electrode 140. The second external electrode layer 200 extends from the second front electrode 132 through a second side surface 110*f* of the substrate 110 to the second back electrode 142. The second side surface 110*f* and the first side surface 110*e* of the substrate 110 are opposite to each other. In some examples, the first external electrode layer 190 covers the first front electrode 130 and the first back electrode 140 to form a C-like structure, and the second external electrode layer 200 covers the second front electrode 132 and the second back electrode 142 to form an inverted C-like structure. In some exemplary examples, the first external electrode layer 190 and the second external electrode layer 200 are approximately 5 μm higher than the first protective layer 170 and the second protective layer 180.

In some examples, a nickel-chromium layer is first formed on the first side surface 110*e* and the second side surface 110*f* of the substrate 110 by, for example, sputtering as a side connection layer, and then a nickel layer and a tin layer are sequentially formed by, for example, electroplating, or a nickel layer, a copper layer, another nickel layer, and a tin layer are sequentially formed. Therefore, the first external electrode layer 190 and the second external electrode layer 200 may include a nickel-chromium layer, a nickel layer, and a tin layer stacked in sequence, or may include a nickel-chromium layer, a nickel layer, a copper layer, another nickel layer, and a tin layer stacked in sequence.

According to the aforementioned embodiments, one advantage of the present disclosure is that the chip resistor of the present disclosure includes a double-layer series resistance structure including a front resistance layer and a back resistance layer. Therefore, the maximum resistance of the chip resistor can be greatly increased.

Another advantage of the present disclosure is that the chip resistor of the present disclosure includes the double-layer series resistor structure that can increase the path of the resistor and the cross-sectional area of the path. Therefore, under a fixed voltage, the voltage gradient per unit length of the resistor can be reduced. In addition, such a structure makes the chip resistor to have a larger heat dissipation area, such that the chip resistor has higher operating power and higher maximum operating voltage.

Although the present disclosure has been disclosed above with embodiments, it is not intended to limit the present disclosure. Any person having ordinary skill in the art can make various changes and modifications without departing from the spirit and scope of the present disclosure. Therefore, the protection scope of the present disclosure should be defined by the scope of the appended claims.

What is claimed is:

1. A chip resistor, comprising:

a substrate having a front surface and a back surface, and a first through hole and a second through hole extending from the front surface to the back surface;

a first conductive structure disposed in the first through hole;

a second conductive structure disposed in the second through hole;

a first front electrode, a second front electrode, and a third front electrode spaced apart from each other on the front surface, wherein the first front electrode and the second front electrode are respectively located on two opposite edge regions of the substrate, and the third front electrode is located between the first front electrode and the second front electrode;

a first back electrode, a second back electrode, and a third back electrode disposed on the back surface and respectively opposite to the first front electrode, the second front electrode, and the third front electrode, and the first back electrode and the first front electrode being respectively connected to two opposite ends of the first conductive structure;

a first resistance layer disposed on the front surface and connected to the second front electrode and the second conductive structure;

a second resistance layer disposed on the back surface and connected to the first back electrode, the third back electrode, the first conductive structure, and the second conductive structure;

a first protective layer covering the first resistance layer, the third front electrode, a portion of the first front electrode, and a portion of the second front electrode;

a second protective layer covering the second resistance layer, the third back electrode, a portion of the first back electrode, and a portion of the second back electrode;

a first external electrode layer extending from the first front electrode through a first side surface of the substrate to the first back electrode; and a second external electrode layer extending from the second front electrode through a second side surface of the substrate to the second back electrode.

2. The chip resistor of claim 1, wherein the substrate is a ceramic substrate, and a material of the substrate is aluminum oxide, aluminum nitride, boron nitride, silicon carbide, or a glass-containing material.

3. The chip resistor of claim 1, wherein a diameter of each of the first through hole and the second through hole is from 0.1 mm to 1.0 mm, a distance between a center of the second through hole and an adjacent short side of the substrate is from ¼ to ⅓ of a length of the substrate, and a distance between the center of the second through hole and an adjacent long side of the substrate is from ⅕ to ½ of a width of the substrate.

4. The chip resistor of claim 1, wherein the first through hole and the second through hole are filled with materials of the first front electrode and the third front electrode respectively, materials of the first back electrode and the third back electrode respectively, or materials of the first front electrode and the first back electrode and materials of the third front electrode and the third back electrode respectively.

5. The chip resistor of claim 1, wherein the first resistance layer and the second resistance layer are connected in series.

6. The chip resistor of claim 1, wherein materials of the first front electrode, the second front electrode, the third front electrode, the first back electrode, the second back electrode, and the third back electrode are copper, copper-nickel alloy, nickel-phosphorus alloy, or sintered silver paste containing silver and glass.

7. The chip resistor of claim 1, wherein materials of the first resistance layer and the second resistance layer are nickel-chromium alloy, copper-nickel alloy, nickel-chromium-silicon alloy, nickel-chromium-aluminum alloy, nickel-chromium-aluminum-silicon alloy, nickel-chromium-aluminum-yttrium alloy, nickel-chromium-tantalum-molybdenum alloy, tantalum nitride, copper-manganese-tin alloy, or copper-manganese-nickel alloy.

8. The chip resistor of claim 1, wherein materials of the first protective layer and the second protective layer are epoxy resin, polyimide, resin, or glass-containing materials.

9. The chip resistor of claim 1, wherein each of the first external electrode layer and the second external electrode layer comprises a nickel-chromium layer, a nickel layer, and a tin layer stacked in sequence, or a nickel-chromium layer, a nickel layer, a copper layer, another nickel layer, and a tin layer stacked in sequence.

10. The chip resistor of claim 1, wherein the first external electrode layer and the second external electrode layer are higher than the first protective layer and the second protective layer by 5 μm or more than 5 μm.

11. A chip resistor, comprising:

a substrate having a front surface and a back surface;

a first conductive structure and a second conductive structure disposed in the substrate and extending from the front surface to the back surface, wherein the first conductive structure and the second conductive structure are adjacent to one side of the substrate;

a first front electrode, a second front electrode, and a third front electrode spaced apart from each other on the front surface, wherein the first front electrode and the second front electrode are respectively located on two opposite edge regions of the substrate, and the third front electrode is located between the first front electrode and the second front electrode;

a first back electrode, a second back electrode, and a third back electrode disposed on the back surface and respectively opposite to the first front electrode, the second front electrode, and the third front electrode, and the first back electrode and the first front electrode being respectively connected to two opposite ends of the first conductive structure;

a first resistance layer disposed on the front surface and connected to the second front electrode and the second conductive structure;

a second resistance layer disposed on the back surface and connected to the first back electrode, the third back electrode, the first conductive structure, and the second conductive structure;

a first protective layer covering the first resistance layer, the third front electrode, a portion of the first front electrode, and a portion of the second front electrode;

a second protective layer covering the second resistance layer, the third back electrode, a portion of the first back electrode, and a portion of the second back electrode;

a first external electrode layer extending from the first front electrode through a first side surface of the substrate to the first back electrode; and a second external electrode layer extending from the second front electrode through a second side surface of the substrate to the second back electrode.

12. The chip resistor of claim 11, wherein the substrate is a rectangular flat plate structure with two short sides and two long sides, and the side of the substrate is one of the two short sides.

13. The chip resistor of claim 11, wherein a diameter of each of the first conductive structure and the second conductive structure is from 0.1 mm to 1.0 mm.

14. The chip resistor of claim 11, wherein a distance between a center of the second conductive structure and the side of the substrate is from ¼ to ⅓ of a length of the substrate, and a distance between the center of the second conductive structure and an adjacent long side of the substrate is from ⅕ to ½ of a width of the substrate.

15. The chip resistor of claim 11, wherein the first resistance layer and the second resistance layer are connected in series.

* * * * *